United States Patent
Turk

[15] 3,640,131
[45] Feb. 8, 1972

[54] HORSEPOWER METER

[72] Inventor: James R. Turk, Solon, Ohio
[73] Assignee: Marine Electro Mechanical, Inc., Wickliffe, Ohio
[22] Filed: May 18, 1970
[21] Appl. No.: 38,108

[52] U.S. Cl. .......................................................73/136 A
[51] Int. Cl. .......................................................G01l 3/10
[58] Field of Search............73/136 A, 194 A, 194 M, 231 M; 324/83 D, 140

[56] References Cited

UNITED STATES PATENTS

| 3,306,105 | 2/1967 | Ichihara et al | 73/231 M |
| 3,194,065 | 7/1965 | Wilson | 73/136 A |
| 3,251,223 | 5/1966 | Barg | 73/136 A |

FOREIGN PATENTS OR APPLICATIONS

| 1,038,211 | 8/1966 | Great Britain | 73/136 A |
| 968,503 | 9/1964 | Great Britain | 73/136 A |

OTHER PUBLICATIONS

IBM Technical Disclosure Bulletin, Vol. 3 No. 2, 1960, pg. 35, copy in 324/83D

Primary Examiner—Charles A. Ruehl
Attorney—Oberlin, Maky, Donnelly & Renner

[57] ABSTRACT

An instrument for providing a visual readout of horsepower, torque or r.p.m. consisting of a shaft interconnected between a load and a power source with a pair of tachometers coupled to the shaft at spaced locations to provide electrical indications of the speed of rotation and amount of twist of the shaft. A digital bidirectional counter and resettable binary coded decimal counter are gated for receipt of indications in two step sequences, to develop the desired signals in the latter counter. Cycling occurs continuously under direction of a sequence generator, and a storage register and display device retain the signals over a period of time to provide the visual readout.

13 Claims, 5 Drawing Figures

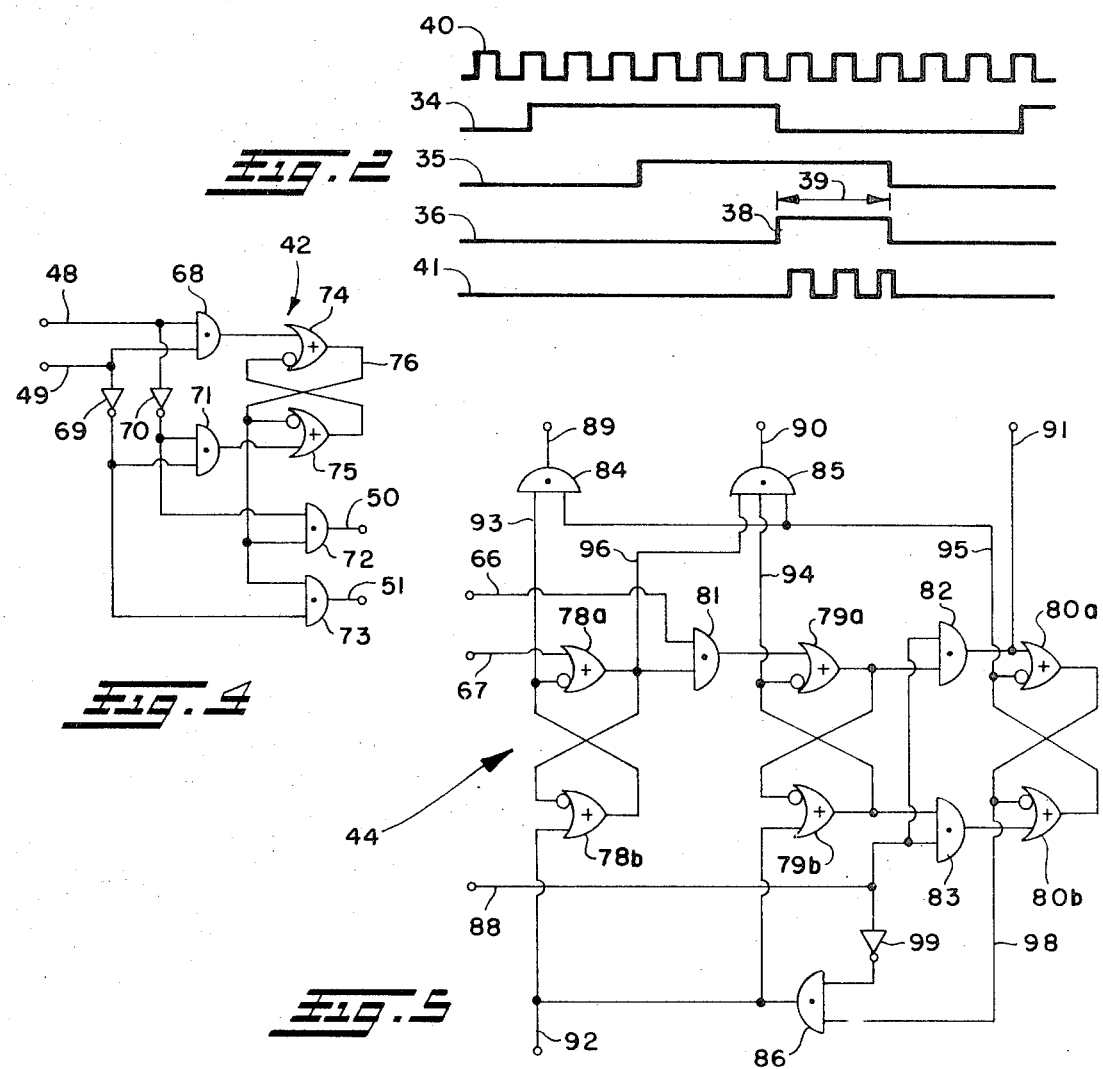

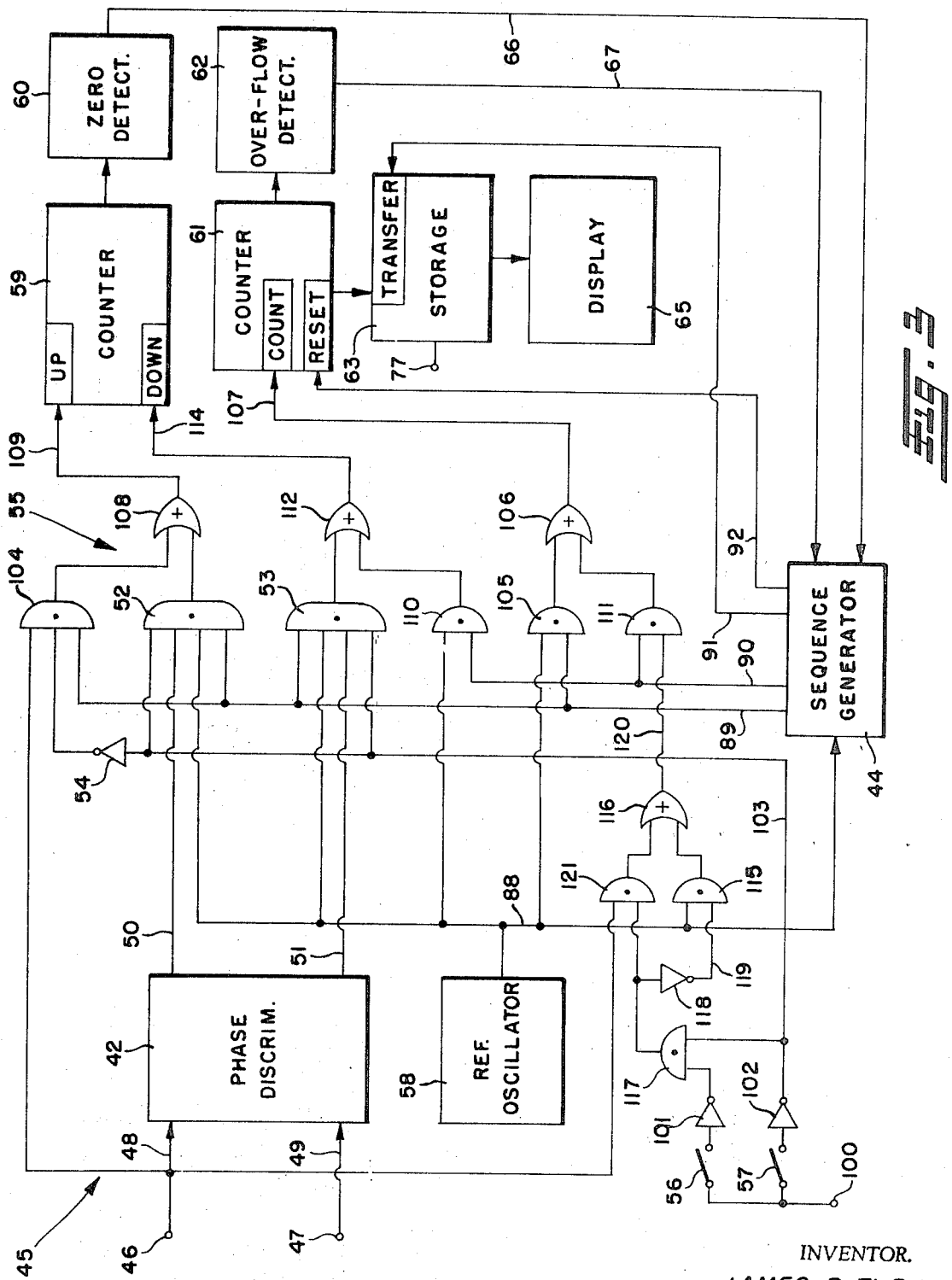

HORSEPOWER METER

This invention relates to monitoring devices and more particularly to an instrument having options for measuring horsepower, torque or speed on a digital basis and for providing a digital display or electrical representation of same.

Prior art horsepower monitoring devices are generally of the analog variety wherein the work output of a form of apparatus is measured in relation to time to provide an evaluation of the capability or effort of the machine. Transducers such as strain gages or load cells have been employed to provide an electrical representation of torque while the speed of a rotating shaft, for example, is measured and combined with the representation for the horsepower calculation.

Similarly for electric machinery, input electrical energy can be utilized for a horsepower measurement, being somewhat inaccurate in requiring a correction for machine efficiency at various operating levels, although a pure electrical or combined electrical and mechanical manipulation of signals can be employed.

The direct measurement of output characteristics is preferred as eliminating extraneous correction factors and the like and the apparatus of the instant invention falls within this category.

In this apparatus a rotating member is utilized for attaining the characteristics of operation, such members in the preferred embodiment of the invention being a precision bar or shaft coupled directly between the power source and the load device for transmission of torque. A pair of electrical digital tachometers are coupled to the shaft at axially spaced locations by means of timing belts to produce a pair of signal wave trains related in phase by the amount of twist of the shaft and thus by the instantaneous torque transmission to the load device. The tachometer signals thus also contain information of the speed of rotation of the shaft and a computation may be performed to obtain the horsepower indication.

The direct conversion of measurement parameters to a digital form precludes the necessity for further conversion devices and the information may be handled in a purely digital manner up to and including the digital readout of the instrument which is provided in the form of a numeric display.

Two digital counters are employed in the system; in the torque mode one being primarily responsive to the phase shift between input signals to provide a measurement of torque, the second primarily providing the measurement of a predetermined time interval, operating in conjunction with a reference pulse generator. Similarly, the counters may be employed in combination to provide a direct measurement of the speed of rotation of the shaft, the time base counter in any mode of operation, providing a correlation or conversion between actual count received and the digit count to be displayed at the output of the system.

The system operates in a two step sequence so that the torque or speed measurements developed in one counter are transferred to the second counter which in turn is directly coupled to the output display circuits, utilizing a storage register for maintaining the display while succeeding sampling intervals are occurring. In the horsepower monitoring mode of operation the torque signal realized in the first counter is combined during the second step of the sequence with the velocity signal obtained directly from the monitoring transducer to provide a resultant count in the second counter proportional to horsepower.

While measurements of torque and velocity in the horsepower mode are obtained over different intervals of time, the speed of the system is sufficiently fast to preclude any substantial error in the output display due to change in horsepower over a short interval of time, and extremely accurate results are obtained. Further the handling of signals in a digital manner provides the advantages of accuracy, definition of signals and extremely wide tolerance against environmental factors such as temperature influences and the like.

Therefore, it is one object of this invention to provide a horsepower measuring instrument which operates on a fully digital basis.

It is another object of this invention to provide improved digital horsepower monitoring apparatus which provides a substantially continual measurement of horsepower output and a visual display in digital form.

It is yet another object of this invention to provide digital monitoring apparatus which has the availability of an output display or electrical representation of horsepower, torque or speed.

It is a still further object of this invention to provide improved horsepower monitoring apparatus which develops digital signal trains from a rotating shaft and cyclically operates upon the signals to produce continuous electrical manifestations representative of the horsepower, torque or rotation delivered by the shaft.

To the accomplishment of the foregoing and related ends, the invention, then, comprises the features hereinafter fully described, the following description and the annexed drawings setting forth in detail an illustrative embodiment of the invention, this being indicative, however, of but one of the various ways in which the principles of the invention may be employed.

In the drawings:

FIG. 1 is a schematic representation of the electrical transducer portion of the apparatus in relation to a power source and load device.

FIG. 2 is a series of graphs of electrical wave shapes occurring within the apparatus of the invention, in relation to a common time base.

FIG. 3 is a schematic diagram partly in block diagram form of the logic interconnection of the complete system.

FIG. 4 is a schematic diagram of the phase discriminator portion of the system, and FIG. 5 is a schematic diagram of a preferred embodiment of sequence generator forming a part of the system.

Referring now to FIG. 1 there is shown in schematic form a typical installation of the apparatus of the invention wherein direct measurements of horsepower, torque or speed can be made and provided as a visual display 10 at the output of the computer 11. A power source 12 which may be a motor or any other motive device is adapted to drive a load 14, being coupled by respective drive shafts 15, 16, a precision torsion bar 18 and a pair of couplers 19. The couplers 19 are of the rigid sleeve type and allow no relative movement between the coupled elements, but the torsion bar 18 is selected to provide suitable twist when transmitting power to the load 14 so that measurements may readily be made. It is clear that such axial twist of the torsion bar 18 is relatively insignificant to the transmission of power from the power source 12 and the load 14 but provides a means for magnifying torque and accordingly such torsion bar is selected to have sufficient power handling capacity, while still providing a magnification twist in the power range of the system.

It will be apparent also that while a precision torsion bar 18 is utilized in the preferred embodiment of the invention, any member coupled in the power train between the power source 12 and the load 14 undergoes a certain amount of distortion in proportion to the power transmitted, so that alternate components might be selected for realizing suitable monitoring signals. Thus, for example, where the rotatable shaft of a motor is directly coupled to a load device, a portion of the shaft itself could be utilized for measuring the torque transmitted, having regard for the lesser twist obtained and the increased requirements for sensitivity and accuracy of measurements.

A pair of digital tachometers 20, 21 are utilized in this embodiment of the invention to provide the monitoring signals for measuring the power source characteristics, the tachometers 20, 21 being schematically shown in FIG. 1 as having drive shafts 22, 23 respectively and providing signal outputs on lines 24, 25 respectively.

A pair of timing belt pulleys 26, 27 are mounted at axially spaced locations along the torsion bar 18 to provide the pickoff points for the sensing signals, the pulleys 26, 27 having supporting collars 28 with setscrews 29 for clamping of same to the torsion shaft 18. The drive shafts 22, 23 of the tachometers 20, 21 have keyed thereon a second pair of timing belt pulleys 30, 31 and the pulleys 26, 30 and 27, 31 are interconnected by means of timing belts 32, 33 to transmit the rotation of the respective portions of the torsion shaft 18 to the drive shafts 22, 23 of the tachometers 20, 21 so that electrical signal outputs are realized on lines 24, 25, directly proportional to the rate of rotation of the torsion shaft 18.

The tachometers 20, 21 are identical and may be of any suitable type to supply a digital output representative of velocity, but preferably are of the type which provide indications of increments of rotation, so that phase relations between the tachometer outputs can be utilized. Thus, pulse-type tachometers of the light-shutter, brush-pickup or variable reluctance types, for example, are suitable to provide trains of pulses having frequencies dependent upon the rate of rotation of the shaft 18.

As noted the pulleys 26, 27 may be adjustably mounted on the shaft 18 not only with respect to axial spacing but also with regard to the relative rotative position of same. Thus by spacing the drive pulleys 26, 27 further apart a greater phase shift can be obtained between the output signals of the tachometers 20, 21 for a given load situation and by relative rotative orientation, an adjustment can be made for bringing the signals into phase at a level of zero power transfer or any other desired level. The pulleys 30, 31 on the drive shafts 22, 23 of the tachometers 20, 21 while being keyed and prevented from relative rotary movement, conveniently can be axially adjusted to follow the adjustment of the pulleys 26, 27 on the torsion shaft 18.

The output signals of the tachometers 20, 21 are depicted in the graph of FIG. 2 at 34, 35 as binary signals having a frequency directly related to the rate of rotation of the torsion shaft 18. The phase shift between signals 34, 35 is indicated in curve 36 as a pulse 38 having a width 39 determined, for example, by the "fall" times of signals 34, 35 and thus proportional to the amount of twist in the torsion shaft 18. Another wave train 40 in FIG. 2 represents the output of a reference oscillator which provides output pulses at a frequency substantially higher than the highest frequency encountered by the tachometers 20, 21 and as indicated in the graph of FIG. 2 such oscillator pulses are gated in the interval 39 of pulse 38 to provide a series of pulses in pulse train 41 proportional in number to the phase shift between the tachometer outputs and thus to the instantaneous torque transmitted by the torsion shaft 18. It will be apparent then that a count of such pulses can be accumulated over a predetermined time interval to provide a measure of actual torque in any desired system of measurement.

Referring now to FIG. 3 there is shown in some detail the overall scheme for computing the horsepower function as well as the torque and speed measurement alternatives and for providing a display of same. Components of the system are depicted in block diagram form for the most part, and a more detailed showing of the phase discriminator 42 and sequence generator 44 utilized in the handling of the digital signals is made in FIGS. 4 and 5.

Input signals to the computer 45 are applied at terminals 46, 47 being connected respectively to output lines 24, 25 of tachometers 20, 21, such terminals 46, 47 being connected in turn as input lines 48, 49 for the phase discriminator 42. The phase discriminator 42 is used partly to compensate for tachometer inaccuracies to provide complete and clean transitions of the binary signal. The functional output of the phase discriminator 42 circuit is realized on one of two output lines 50, 51 depending upon the relative phase of the tachometer signals, that line forming the pulse 38 indicative of the phase shift interval depicted by the curve 36 in FIG. 2, while the other line remains at a zero level.

The output lines 50, 51 of the phase discriminator 42 are applied as conditioning signals to a pair of four input AND-gates 52, 53 for a part of the control of the torque and horsepower measurements of the system. For purposes of this description the conventional symbols for the AND and OR gates are utilized, the gates requiring high-level conditioning signals for production of a high-level output signal in a manner well understood in the art. Further components included in the logic portion of the system include inverter amplifiers, shown as a triangle in conjunction with a small circle at the output thereof as at 54, and OR gates with inverting inputs represented by a small circle, depicted in the FIG. 4 and FIG. 5 showings. Other than the logic circuitry for switching the various electrical signals throughout the system depicted generally by the AND- and OR-gates at 55, components of the system further include the speed and torque selector switches 56, 57 which are operated in common for measurement of horsepower, a reference oscillator 58 for supplying counting pulses to the system, the sequence generator 44 for controlling the switching of the logic gates and transmission of information in the system, a bidirectional binary counter 59 having an auxiliary zero detect function 60, a resettable binary coded decimal counter 61 having an overflow detection circuit 62, a storage register 63 adapted to receive total count information from the resettable counter 61 upon command from a transfer signal on line 91 and a display unit 65 for providing a visual indication of the total count in the storage register 63.

The counters 59, 61, auxiliary functions 60, 62 and storage and display units 63, 65 may be conventional components not requiring detailed description but in the preferred embodiment of this invention where it is desired to perform computations to an accuracy of three decimal places such resettable counter 61 would desirably have a capacity of 1,000 counts and correspondingly set the scale of the bidirectional counter 59, chosen to be a 10-stage counter having a capacity of 1,024 counts. The counter 61 and storage unit 63 which comprises a buffer register and display driver are contained in large scale integrated circuits which preferably are of the General Instruments type MEM 1056. A complementing display tube, namely the Tung-Sol DT 1704A is used as display 65 and some discrete interface circuits are required, these being readily ascertained by those skilled in the art. The zero detector 60 and overflow detector 62 are gating circuits providing the named functions of sensing when the bidirectional counter 59 has been counted down to a zero count and when the resettable counter 61 has reached a maximum count, thereby providing indications on output lines 66, 67 respectively. The phase discriminator 42 and sequence generator 44 are designed for application in this system and are depicted in detail in FIGS. 4 and 5.

PHASE DISCRIMINATOR

Referring to FIG. 4, input signals are received at the phase discriminator 42 at lines 48, 49 being directly connected to the output of the digital tachometers 20, 21. Both inputs are connected directly to an AND-gate 68 to provide an output therefrom when both input signals are at a high level. The input signals are inverted in a pair of amplifiers 69, 70 and applied to AND-gate 71 to provide an output signal therefrom when both of the input lines 48, 49 are at a low level. Such inverted signals are further coupled directly to a second pair of AND-gates 72, 73 as one set of conditioning signals.

The outputs of the AND-gates 68, 71 are connected respectively to a pair of OR-gates 74, 75 interconnected to provide a flip-flop function, providing a change in state of the output line 76, which is in turn connected to the output AND-gates 72, 73, upon a change in state of the signals from the input AND-gates 68, 71.

Thus for example when the signal on the line 49 is leading the signal on line 48 in phase, such leading signal will control the timing of the change in state of line 76 and thus the switching of the output gates 72, 73. Due to the inversion in amplifier 69 AND-gate 73 will always receive opposite conditioning signals and thus provide no output on line 51 while AND-gate 72 will receive common high-level signals during the interval when the input lines 48, 49 are of a different state to provide a high-level output signal at that time on line 50 and as indicated by the graphs in FIG. 2. With the reverse phase relation of the input lines 48, 49, an opposite condition for the output gates 72, 73 will obtain with gate 73 now providing the high-level signals determinative of the phase shift with the output of gate 72 remaining at a low-signal level. Output lines 50, 51 thus can control the up or down counting interval of the bidirectional counter 59.

SEQUENCE GENERATOR

Referring now to FIG. 5, the sequence generator 44 comprises three pair of OR-gates 78a, b; 79a, b; 80a, b interconnected to provide flip-flop functions together with interconnecting AND-gates 81–86 for signal transmission. The sequence generator 44 receives the zero detect signal at line 66, overflow detect signal at line 67 and reference oscillator 58 signal at line 88 and provides high-level output gating signals on line 86–92.

In operation then, assuming the OR-gates 78–80 to be in a clear condition providing high-level signals on lines 93–95, gate 84 will be conditioned to provide a high-level signal on line 89. Such signal will be maintained until an overflow signal is received on line 67 to cause setting of the OR-gates 78 providing a high-level output signal on line 96 for application to output gate 85 and the control gate 81.

Output gate 85 will now be conditioned to provide a high-level output signal on line 90 and will remain in this state until a zero detect signal is received on line 66 which conditions the AND-gate 81 to change the OR-gates 79 to the set condition.

Previous to receipt of the zero detect signal AND-gate 83 has been conditioned to pass reference signals on line 88 to the OR-gates 80 to maintain them in the clear state but once the OR-gates 79 have been set to the one state the AND-gate 82 will be conditioned to pass the next succeeding reference pulse to change the OR-gates 80 to the set state providing also an output transfer signal on line 91.

Subsequently AND-gate 86 will be conditioned by the high-level signal on line 98 to pass succeeding reference pulses via inverter 99 to output line 92, providing a reset pulse, and also applying clear pulses to the OR-gates 78, 79 to return them to their original clear state. A succeeding reference pulse through the AND-gate 83 then will set OR-gates 80 to the clear state whereupon the circuit will be returned to its initial condition to continuously repeat the cyclic pattern when overflow and zero detect signals are received on lines 66, 67.

SPEED MODE

Referring again to FIG. 3, the speed mode of operation is selected by closure of the speed switch 56 and the open condition of the torque switch 57. A continuous low-state signal is applied at the input terminal 100 which then is directly coupled to the input of the inverter amplifier 101 and prevented from reaching the input of another inverter amplifier 102. The output of the latter amplifier 102 on line 103 will thus be at a low state and such condition will be converted by a third inverter amplifier 54 to provide a high-level conditioning signal as one input to a three input AND-gate 104. A second input to the AND-gate 104 is received from the tachometer input terminal 46 while the third input is conditioned from line 89 of the sequence generator 44. Line 89 simultaneously conditions AND-gate 105 which receives as its second input pulses from the reference oscillator 58 via line 88, the output in turn applied through OR-gate 106 to the count input 107 of the resettable counter 61.

At the same time the output of the three input AND-gate 104 is applied through OR-gate 108 to the up count input 109 of the bidirectional counter 59 so that both counters 59, 61 count simultaneously and respectively the tachometer 20 pulses and the reference oscillator 58 pulses. Counting continues until the resettable counter 61 reaches a maximum count to energize the overflow detect circuit 62 and provide an output on line 67 to the sequence generator 44 to cause stepping of same to the second condition, thereby removing the conditioning signal on line 89 from the AND-gates 104, 105. The resettable counter 61 thus provides a definite time interval over which the speed measurement is made and since such interval is consistent the ultimate count realized in the bidirectional counter 59 will be directly proportional to speed of rotation of the torsion shaft 18.

In the second step of the sequence, line 90 of the sequence generator carries a conditioning signal to AND-gates 110, 111 for controlling the application of pulses to the counters 59, 61. AND-gate 110 receives as a second input pulses from the reference oscillator 58 by way of line 88 and applies the pulses through OR-gate 112 to the down input 114 of the bidirectional counter 59. AND-gate 111 also receives as a second input pulses from the reference oscillator 58 being directed by way of AND-gate 115 and OR-gate 116, the AND-gate 115 having been conditioned by the state of the speed and torque mode switches 56, 57 which allow the output of the AND-gate 117 to remain at a low level and via the inverter amplifier 118 provide the high-level conditioning signal at input line 119 of the AND-gate 115.

Counting up of the resettable counter 61 will thus occur at the same rate as counting down of the bidirectional counter 59 until the latter energizes the zero detect circuit 60 to cause further stepping of the sequence generator 44 by way of line 66 to remove the conditioning signal from line 90.

As set forth in the described operation of the sequence generator 44 a transfer pulse on line 91 then will transfer the count from the resettable counter 61 to the storage unit 63 and a succeeding pulse on line 92 will reset the counter 61 for further cycling. The output of the storage unit 63 is connected to the display device 65 and a visual display of the count now proportional to the speed of rotation will be provided.

Recycling of the circuit will occur dependent in part on the frequency of the reference oscillator 58 and the capacity of the resettable counter 61 while the output display is maintained over the interval, such display changing at the end of each counting interval, but under most conditions, recycling so quickly and undergoing little change, as to accumulate the count for ready visual interpretation.

As indicated in FIG. 1 the display 10 of the display register 65 is in decimal form, being readily converted from the binary coded decimal format of the resettable counter 61. Further it is apparent that an electrical representation of the speed indication is available from the circuitry in digital form which may be used directly or converted to an analog signal for utilization in external systems, if desired, a similar output also being available in the torque and horsepower measuring modes as torque and horsepower signals.

Such electrical representations could be used, for example, as monitoring or control signals in automatic machine control systems where characteristics of machine performance are required. The signals are continuously available in the storage register 63 and appear at output terminal 77, representing an appropriate number of access leads.

TORQUE MODE

In measuring torque, utilization is made of both outputs of the tachometers 20, 21, applied via terminals 46, 47 to input lines 48, 49 of the phase discriminator circuit 42 to provide the conditioning signals on output lines 50, 51 depending upon the relative phase of the received signals as described previously. For purposes of this description line 50 will be considered to carry the conditioning signals while line 51 remains at a low level.

Selection of the torque mode is made by the closure of the torque switch 57 and the open state of the speed switch 56 which applies a low level signal from terminal 100 to inverter amplifier 102 and thus a high-conditioning level on the output line 103 which is applied to both four-input AND-gates 52, 53 for partial conditioning of same. The AND-gates 52, 53 receive also pulses from the reference oscillator 58 on line 88 and a conditioning signal from the sequence generator 44 on line 89 in the first step. Such conditioning signal is also applied to AND-gate 105 which receives as its second input pulses from the reference oscillator 58 on line 88 for application through OR-gate 106 to the count input line 107 of the resettable counter 61.

Thus in this step of the sequence generator 44 the resettable counter 61 will be counted to its full count at the rate of the reference oscillator 58 until an overflow detect signal is received on line 67 to step the sequence generator 44 to the next condition. In this same interval AND-gate 52 will be conditioned for passage of pulses from the reference oscillator 58 through OR-gate 108 to the up input 109 of the bidirectional counter 59 only in the intervals when the output of the phase discriminator 42 is in a conditioning mode. As set forth in the detailed description of the phase discriminator 42 such conditioning mode is obtained only during the phase shift interval of the signals from the tachometers 20, 21 varying in duration proportional to the phase shift, so that the total count realized in the bidirectional counter 59 over the interval set by resettable counter 61 is proportional to the twist and thus the torque of the torsion shaft 18.

In the second step of the sequence, with line 90 at a high level, AND-gates 110, 111 will be conditioned for passage of pulses from the reference oscillator 58, the former by way of line 88 and OR-gate 112 to the down input 114 of the bidirectional counter 59 and the latter by way of pulses received on line 120 for passage through the OR-gates 106 to the count input 107 of the resettable counter 61. The open setting of the speed switch 56 provides a low signal at the output of the AND-gate 117 which is changed to a high-level signal in inverter 118 for conditioning the AND-gate 115 for passage of the reference oscillator pulses on line 88 to the OR-gate 116.

Such action is similar to that obtained in the speed mode of operation of the system and the total count in the bidirectional counter 59 will be transferred to the resettable counter 61, again a zero detect signal on line 66 stepping the sequence generator 44 to generate a transfer signal on line 91. The contents of resettable counter 61 will be transferred to the storage register 63 and thus the display unit 65 and thereafter the circuit will be reset by a pulse on line 92. Such circuitry also will recycle continuously so long as the input conditions are maintained to provide a continuous monitoring of the torque transmitted between the power source 12 and the load device 14.

HORSEPOWER MODE

This mode of operation is selected by closure of both the speed and torque switches 56, 57 to again provide conditioning in the first step of the four input AND-gates 52, 53 in a manner similar to that described in the torque mode and similarly to provide pulses from the reference oscillator 58 to the resettable counter 61 by way of the AND-gate 105 and OR-gate 106. As described a count will be realized in the bidirectional counter 59 proportional to the torque transmitted by the shaft 18 in the first step of the sequence generator. Upon receipt of an overflow detect signal on line 67 the sequence generator 44 will step to the next mode providing a high-level conditioning signal on output line 90 thereby conditioning the AND-gates 110, 111 for receipt of pulses. AND-gate 110 receives as a second input on line 88, pulses from the reference oscillator 58 and passes same through the OR-gate 112 to the down input 114 of the bidirectional counter 59.

By virtue of the closure of the switches 56, 57, low-level signals will be realized at the inputs of the inverters 101, 102 and high-level signals at the inputs to the AND-gate 117 thereby providing a high-level signal also to the further AND-gate 121. AND-gate 121 receives as a second input pulses directly from the tachometer 20, being connected by line 48 and transmits same through the OR-gate 116 to the further AND-gate 111, a succeeding OR-gate 106 and then to the count input 107 of the resettable counter 61. The resettable counter 61 thus will count pulses at the rate supplied from the tachometer 20, providing an input proportional to speed of rotation of shaft 18 and will count over the interval determined by the counting down of the torque quantity in the reversible counter 59 by the reference pulses, the count being terminated by a zero detect signal on line 66 which steps the sequence generator 44.

Thus the count realized in the resettable counter 61 is now proportional to the product of the torque signal originally obtained in the bidirectional counter 59 and the speed signal obtained directly from the tachometer 20 so that the total count contained therein is a measure of the horsepower during that cycling interval. As set forth previously the sequence generator 44 then acts to transfer the signal to the storage unit 63 and display unit 65 and subsequently resets the counter 61 for continuous recycles for succeeding measurements. The output of the display unit 65 will be a digital display of the horsepower indication over that interval and will be continuously corrected upon succeeding measurement intervals.

I claim:

1. Apparatus for monitoring the horsepower delivered by a rotatable shaft comprising first and second sensors disposed at axially spaced locations along the shaft for developing digital signals representative of the twist and speed of rotation of the shaft, digital counting means operatively connected with said first and second sensors for combining said twist and speed signals to provide a resultant output signal representative of horsepower, means operatively connected with said digital counting means for visually displaying the horsepower signal and a sequence generator operatively connected with said digital counting means and said display means for actuation thereof, said display means comprising means for storing the horsepower signal during the counting interval of said digital counting means.

2. Apparatus as set forth in claim 1, wherein said digital counting means comprises first and second digital counters and a reference pulse generator, said first digital counter being operatively connected to said first and second sensors and said pulse generator for developing an output proportional to torque in the rotatable shaft, said second digital counter being operatively connected to receive the output of said first digital counter and one of said first and second sensors for developing the horsepower signal.

3. Apparatus as set forth in claim 2 wherein said sequence generator is operative to energize said first and second digital counters in a two-step sequence.

4. Apparatus for monitoring the output of a power source comprising means for developing first and second binary signals continuously representative of the output of the power source, the signals having a frequency proportional to the speed of rotation of the power source and a phase shift therebetween proportional to the output torque, said signal developing means comprising a shaft interconnecting the power source with a load device driven thereby, a pair of binary output generators, and means for coupling said generators to said shaft at axially spaced locations thereon to provide a phase shift between the output signals of said binary generators proportional to the torque transmitted by said shaft, a reference pulse generator, first and second counters, and sequencing means operative to selectively interconnect said counters, said pulse generator and said signal developing means to develop a total count in said second counter proportional to a desired output characteristic of the power source.

5. Apparatus as set forth in claim 4 wherein said coupling means comprise timing belts for transmitting the rotation of said shaft to said binary generators.

6. Apparatus as set forth in claim 4 wherein said sequencing means is operative in a first step to interconnect said first and said second counters with said pulse generator to develop a count in said first counter as a function of the count in said second counter, and in a second step to transfer the count in said first counter to said second counter.

7. Apparatus as set forth in claim 6 further including display means operatively connected with said second counter for visual display of the count therein at the completion of the second step.

8. Apparatus as set forth in claim 4 wherein said sequencing means is operative in a first step to interconnect said first and second counters with said signal developing means to develop a count in said first counter as a function of the count in the second counter, and in a second step to develop a count in said second counter as a function of the count in said first counter and the signal of one of said signal developing means.

9. Apparatus as set forth in claim 8 further including display means operatively connected with said second counter for visual display of the count therein at the completion of the second step.

10. Horsepower computer apparatus, comprising
means for developing a train of pulses having frequency proportional to rate of rotation of a device being monitored and pulse width proportional to torque,
a reference oscillator,
a digital counter,
a bidirectional digital counter,
first gating means interconnecting said reference oscillator with said digital counter and interconnecting said pulse train developing means and said reference oscillator with said bidirectional counter for developing a count in the latter proportional to torque,
second gating means interconnecting said reference oscillator with said bidirectional counter and interconnecting said pulse train developing means with said digital counter for developing a count in the latter proportional to horsepower, and
sequence means for sequentially actuating said first and second gating means in response to predetermined counts in said digital counter and said bidirectional counter.

11. Apparatus as set forth in claim 10 further including overflow detection means operatively connected with said digital counter for controlling said sequence means.

12. Apparatus as set forth in claim 11 further including zero count detection means operatively connected with said bidirectional digital counter for further controlling said sequence means.

13. Apparatus as set forth in claim 12 further including display means operatively connected with said digital counter, said display means being energized by said sequence means.

* * * * *